United States Patent [19]

Sol

[11] Patent Number: 5,283,552
[45] Date of Patent: Feb. 1, 1994

[54] WATER PLUMBING INSTRUMENTATION AND CONTROL SYSTEM FOR RECREATIONAL VEHICLES AND MARINE VESSELS

[76] Inventor: David Sol, 26500 W. Agoura Rd., Ste. 383, Calabasas, Calif. 91302

[21] Appl. No.: 4,298

[22] Filed: Jan. 14, 1993

[51] Int. Cl.$^5$ .............................................. G01M 3/28
[52] U.S. Cl. ................................... 340/605; 73/40.5 R
[58] Field of Search ...................... 73/40.5 R; 340/605

[56] References Cited

U.S. PATENT DOCUMENTS

| 4,916,437 | 4/1990 | Gazzaz ................... 73/40.5 R X |
| 5,187,973 | 2/1993 | Kunze et al. ................ 73/40.5 R |

FOREIGN PATENT DOCUMENTS

| 90795 | 4/1988 | Japan ............................. 73/40.5 R |
| 2120794 | 12/1983 | United Kingdom ............ 73/40.5 R |

*Primary Examiner*—Hezron E. Williams
*Assistant Examiner*—Joseph W. Roskos

[57] ABSTRACT

The invention provides instrumentation and control of the water plumbing system of a recreational vehicle, marine vessel or other such mobile self-contained environment. In addition to indicating externally supplied water pressure, typically from park or dock pressurized hook-ups, either a leak or an excessive pressure condition is detected, to which the device responds by energizing an appropriate alarm and performing safety functions. In the event of a leak, the onboard water pump is disabled and the external water supply is diverted from the vehicle plumbing and dumped to the onboard fresh water supply tank which is vented, thereby allowing overflow to the exterior of the vehicle instead of the interior. In the event of the external water pressure exceeding a safe allowable value the same dumping action is initiated to protect the plumbing system, or alternatively the device can provide for isolating the plumbing system from this external over-pressure. Utilizing instrumentation which typically already exists, this dumping action can also be initiated by the user to test the safety actuation and to automatically fill a fresh water tank to a variety of selectable levels, either from a central control panel or a remote location.

15 Claims, 5 Drawing Sheets

WATER PLUMBING INSTRUMENTATION AND CONTROL SYSTEM FOR RECREATIONAL VEHICLES AND MARINE VESSELS

BACKGROUND OF THE INVENTION

I. Field of the Invention

The present invention relates to a device for use in recreational vehicles, marine vessels, and other such mobile self-contained living environments. The device provides instrumentation and control functions for the water plumbing system of such recreational vehicles.

II. Description of the Prior Art

Self contained recreational vehicles (RV's) and marine vessels contain an on-board supply tank of fresh water and an electric demand pump to provide water pressure to the plumbing system enabling flow to appliances such as faucets, a shower, or toilet which then drain into various waste tanks. As is known in the art, the plumbing system can be connected to an external pressurized water supply when available, such as hookups available from an RV park or dockside. Typically the connection is made by a standard garden hose.

Commercially available systems are typically installed to indicate the water level in the fresh water supply tank. U.S. Pat. No. 5,079,950 of McKiernan, U.S. Pat. No. 4,358,956 of Ruben et al, and U.S. Pat. No. 5,103,673 of Sawada et al are examples in the prior art which accomplish this level indication utilizing some assembly or sensor mounted in the tank. U.S. Pat. No. 4,145,927 of Larson is an example of level indication using a non-intrusive method by sensing the variation in capacitance between the walls of the tank as the water level changes. U.S. Pat. No. 4,739,658 of Slavik is an example of an extremely common implementation in the art utilizing commercially available conductive probes protruding into the tank at varying heights to sense the presence of water at different levels.

Typically in the art the fresh water tank is filled manually from a fill tube which is accessed from a hatch in the exterior of the vehicle. A relatively few commercially available RV's, typically more expensive luxury models have an installation permitting the manual opening of a valve to allow water flow from the external pressure source into the tank, a somewhat more convenient arrangement. U.S. Pat. No. 4,039,001 of Weldy uses a pressure switch to detect the presence of an externally available pressure to open a solenoid actuated valve so as to back-fill the tank with water automatically U.S. Pat. No. 4,744,385 of Houghton also provides means to use the external pressurized supply to flush and dump the waste tanks of the RV.

U.S. Pat. No. 4,109,604 of Reed relates to transport of RV's on water carriers and provision of fresh water and removal of waste water to and from the RV's so as to keep the center of gravity of the water such that the carrier stays level, and as such does not address the water pressure or levels of the tanks within the RV's.

The plumbing systems and fittings in RV's are typically made from lower pressure, light weight components relative to residential plumbing and therefore a water pressure regulator can be installed between the external water pressure source and the RV plumbing connection to protect the internal RV plumbing system from high municipal, park, or dockside pressure. Indication of the actual water pressure is normally not provided, and the more expensive water pressure regulators that do provide such indication unfortunately use only a mechanical dial gage which is installed at the water source, not at or within the RV for convenient inspection. The water pressure regulators commercially available to RV owners are normally of a simple spring diaphragm type and subject to frequent failure as they get stuck either open, closed, or in between. Failure of the water pressure regulator can therefore lead to reduced pressure, or worse, higher pressure than that recommended for RV-type plumbing, normally about 60 psi. This failure can occur without knowledge of the RV owner. Also, due to the lightweight nature of the plumbing and the constant vibration of the vehicle, the fittings of the plumbing system are prone to leaks. Depending on the size of the leak and the routing and location of the plumbing, some time normally passes before the leak is detected, usually after some degree of vehicle interior wood or carpet damage has occurred. An unattended vehicle or one with occupants asleep can incur a higher degree of damage, since either the external source will provide flow indefinitely if hooked up or, if not hooked up, the on board pump can empty the entire fresh water tank Further, the on board demand pump will run dry and heat up, causing permanent damage.

As is evidenced from the discussion of the prior art, there is a need in the art for improved instrumentation and control of water pressure. Further, although the prior art provides for instrumentation of water level, the best control of water level in the art is only to automatically fill the tank until full. As is known in the art, the added weight of a full tank is undesirable since the large weight of the water can severely detract from vehicle performance, particularly when traveling up grades in mountainous terrain. Further, the penalty in gas mileage and performance due to the added weight is often unnecessary since the owner of the RV may only need a fraction of a tank for a given trip or weekend. Also, when traveling, the RV owner often knows the occupants will only need such a fraction of a tank for the present travel segment, after which he may hook-up at an RV park for the night, for example, providing the opportunity to refill for the next leg of the journey. At this time the waste tanks can also be dumped. In addition to commercial RV parks, many rest areas on the nation's highways provide for such facilities. The ability to conveniently use such resources to refill the tank only partially would maintain the vehicle payload weight, gas mileage, and vehicle performance while meeting the water needs of the occupant(s).

There is a need in the art to provide the RV owner with improved control over fresh water supply level and the flexibility to automatically fill to a user selectable level.

Further, the prior art does not provide for the enabling of automatic filling from more than one location and as such does not provide for the convenience of performing this operation when hookups to the RV are being made at the external water supply access location.

Further, since in the prior art the filling of the water tank required the addition and installation of additional and expensive hardware components such as pressure switches, float valves and the like, there is a need for such a system which utilizes already existing instrumentation and does not have inherent difficulties in installation such as removing tanks, intrusively mounting float assemblies, and so forth.

SUMMARY OF THE INVENTION

The present invention meets these needs by providing for instrumentation and control of fresh water supply pressure and level, including alarm and safety functions.

Indication of water pressure is provided at a centrally located display and control panel inside the RV. A leak condition is detected by processing a pressure signal and detecting a decrease. When detected the leak condition is displayed and alarmed. Safety functions are then performed to prevent water leakage into the RV interior, whether the water pressure is due to the onboard demand pump, the external source or both. The onboard water pump is disabled to prevent not only leakage flow but also dry running and heat-up, and the external water supply is diverted from the vehicle plumbing and dumped to the onboard fresh water supply tank which is vented to atmosphere, thereby allowing overflow to the exterior of the vehicle instead of the interior. Alternatively the RV plumbing system can be isolated from the exterior water supply pressure if an isolation valve is installed.

The pressure in the water supply plumbing is monitored and an over-pressure condition is detected and alarmed. The device then performs the safety dumping action as described above in response to a leak, thus effectively relieving the overpressure of the supply line to atmosphere by dumping the supply pressure line flow to the vented fresh water tank. If an isolation valve is installed, the device will isolate the plumbing system from externally supplied overpressure. The safety dumping action can also be manually performed from the central panel of the device to provide for testing of the actuation circuitry.

The installed existing tank level instrumentation normally consist of conductive probes, which are inexpensive and can be easily installed if not originally provided. The device utilizes this instrumentation by allowing the above dumping action to be intentionally enabled until the level in the tank reaches a user selectable height, such as low or high, at which time the dumping action is terminated. The invention also provides for enabling this action at multiple locations: either the centrally located panel inside the RV or a remote water supply access hatch on the exterior. Indication of the dump being enabled is provided at the central panel.

DESCRIPTION OF THE PREFERRED EMBODIMENT

Figure 1:
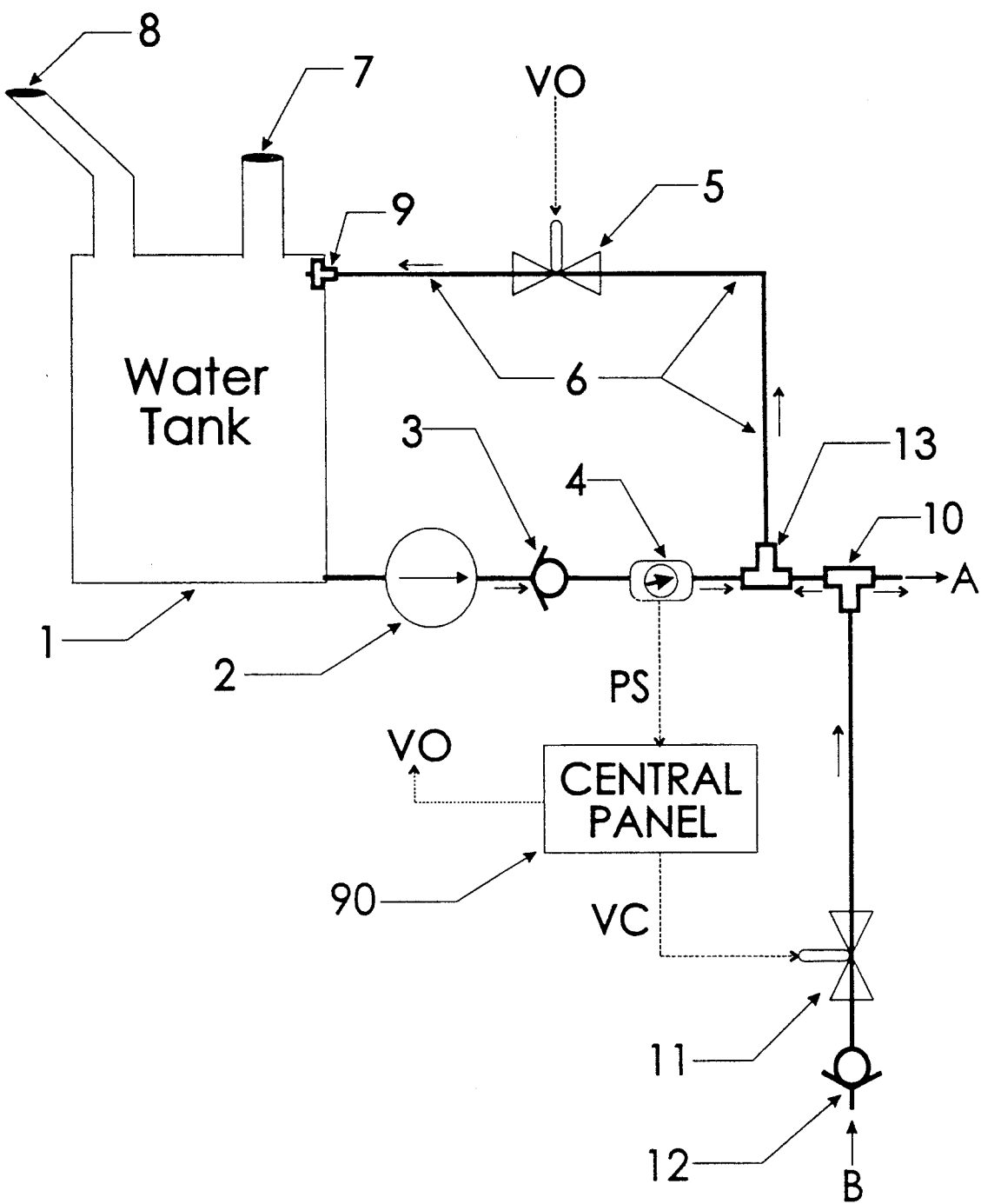
FIG. 1 is a diagram showing the invention and system components installed in a typical recreational vehicle plumbing system with instrumentation and control signals indicated to and from various components.

Referring first to FIG. 1, the basic features of a preferred embodiment of the invention are shown as installed in the typical plumbing arrangement of a recreational vehicle, marine vessel, or other self-contained living environment.

The manner in which the electrical signals PS, VC, and VO shown are processed and generated will become apparent in later figures and discussion. What is first described herein is the typical manner by which the plumbing system of such a vehicle or vessel is supplied with water so as to enable operation of various faucets, showers, toilets, etc. which are not explicitly shown but understood to be downstream of water line outlet A.

A fresh water tank 1 as typically installed is vented to the outside atmosphere by vent 7 and is filled through fill tube 8 which is normally accessible from the exterior. Water can be supplied to the plumbing system appliances through operation of pump 2. Alternatively, when externally supplied water pressure is available from park or dockside hookups or the like, water can be supplied to the system at inlet B, normally accessible from the exterior. The external water pressure is normally transmitted to the system by virtue of direct communication through Tee-fitting 10, since optionally installed isolation valve 11 is a normally open valve. Typically installed is check valve 12 to prevent water flow to the outside when pump 2 is used to provide water pressure, normally ensuring flow to the plumbing system since water line 6 installed through Tee-fitting 13 is not normally an open path leaving outlet A the only path for water flow under pressure. Additionally, typically installed check valve 3 prevents water flow through the pump 2 into the vented water tank 1, again normally ensuring flow to the plumbing system.

What will now be described are modes of operation above and beyond the normal operation just described, such modes being initiated by the invention for protection from leaks or overpressure conditions which may exist in the plumbing system. Still referring to FIG. 1, in the preferred embodiment of the invention, a pressure sensor 4 is installed downstream of the check valve 3. The pressure sensor provides the electrical signal PS, indicative of the water pressure in the plumbing system. This pressure signal is input to the central panel 90 which uses it to provide instrumentation and control functions, the details of which will be described shortly. In order to facilitate the normal operation as previously described, the water line 6 as installed through Tee-fitting 13 does not provide a path for water flow under normal conditions by virtue of the installation of the normally closed valve 5. However, in response to a control signal commanded by the invention, water can be allowed to flow from the fitting 13 through valve 5 in an opened condition, through fitting 9 installed in the top or side of the vented water tank 1. In the preferred embodiment, for example, this is accomplished by the control signal VO being supplied by the central panel to energize the coil of normally closed valve 5, thereby opening the valve to permit flow.

Figure 2:
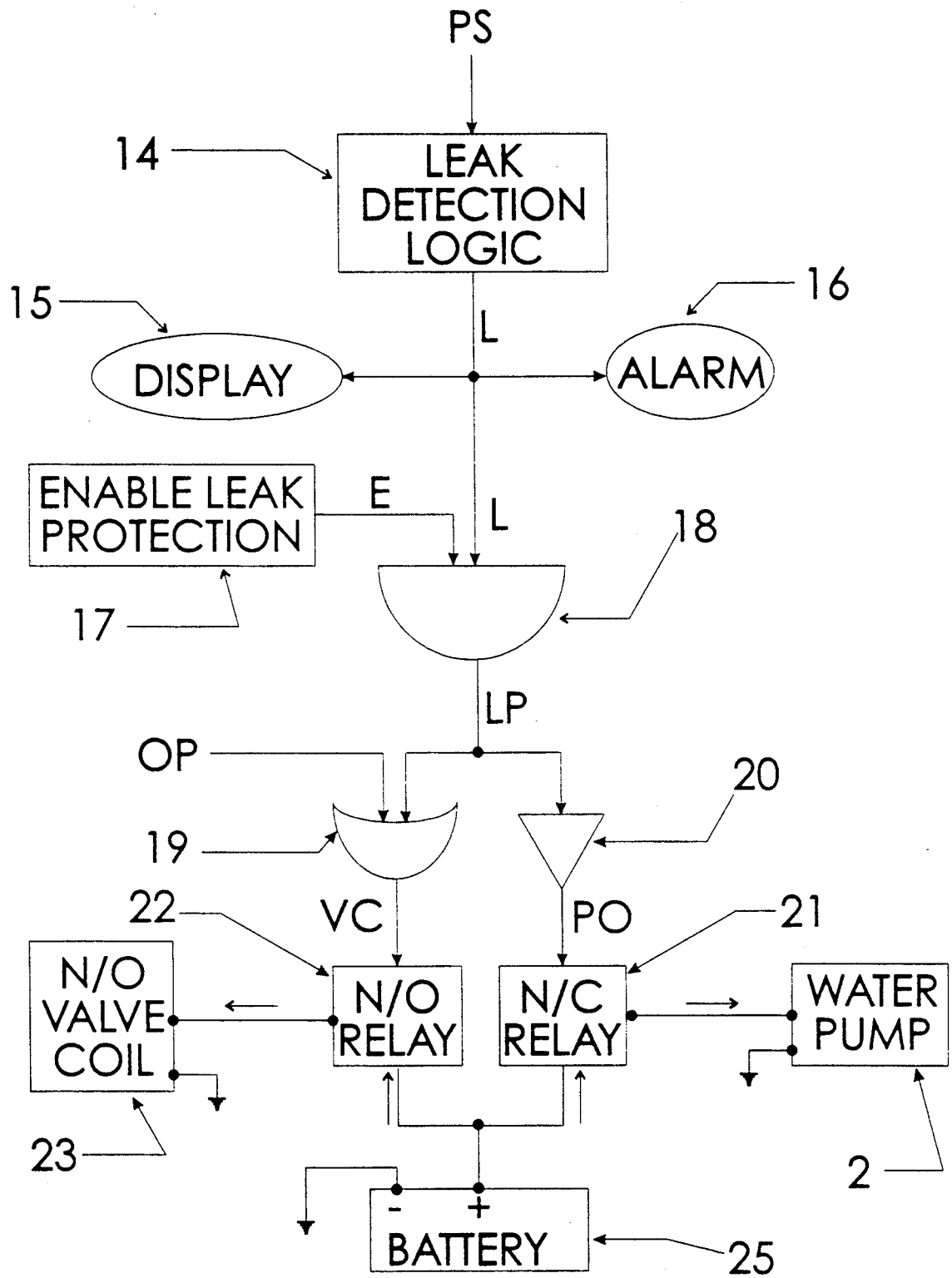
FIG. 2 is a functional block diagram showing the generation of the control signals shown in FIG. 1 in response to the detection of a leak by the device.

Referring now to FIG. 2, the safety functions performed by the invention when a leak is detected will be described. The leak detection logic 14, described in further detail later, accepts the electrical signal PS as an input and outputs a signal L. In a preferred embodiment, the electrical signal L is a digital signal which is set to a voltage level representing the 'high' or 'ON' state representing a logical one when the leak detection logic detects a leak. This signal L is applied to a display indicator 15, for example an LED (light emitting diode) to provide visual indication of the leak condition. Additionally the signal L is applied to an audible alarm 16 to alert the occupants to the presence of a leak. The signal L is applied to the input of logical AND gate 18 along with the signal E. The signal E is provided by the leak protection enable arrangement 17 which comprises a two position switch, preferably mounted on a central panel, so that when set to one position, the enable position, the signal E is energized high or ON, otherwise the signal E is low or OFF. In the event that the leak protection is enabled so E is ON and the signal L is also high, the output of the AND gate 18, signal LP, will go from a logical zero to a logical one.

Still referring to FIG. 2, in the event of the signal LP going ON or high from leak detection, two leak protection safety functions are performed by the invention to prevent the leakage of water into the interior of the vehicle. The signal LP is then applied through OR gate 19 and buffer 20 to produce signals VC and PO such that VC and PO are of the same polarity as LP. The signal PO is then used to turn off the previously discussed water pump 2 in prior FIG. 1, by energizing the coil of normally open relay 21, thereby interrupting the flow of current from battery 25 to the demand water pump 2, previously represented for hydraulic purposes in prior FIG. 1. The onboard pump is thus disabled and the leakage of water due to its operation is prevented, as well as dry running and heat-up of the pump. The other leak protection safety function is performed with the signal VC, used to close the valve previously discussed as valve 11 in prior FIG. 1. This is accomplished in the embodiment by applying signal VC to the coil of normally open relay 22 such that when VC is ON, the flow of current is interrupted from the battery 25 to the normally open coil 23 of the valve 11 previously represented for hydraulic purposes in prior FIG. 1, thereby facilitating the closure of said valve which isolates the vehicle plumbing system from the externally applied water pressure. With both the demand water pump disabled and the externally supplied pressure isolated in response to the leak detection, no water pressure source is now present to provide water flow through the plumbing leak. If the valve 11 of prior FIG. 1 and associated valve coil 23 were not installed for isolation, the leak protection signal LP could also be used to prevent externally supplied water flow to the interior by a dumping action, the details of which will be described later.

Figure 3:
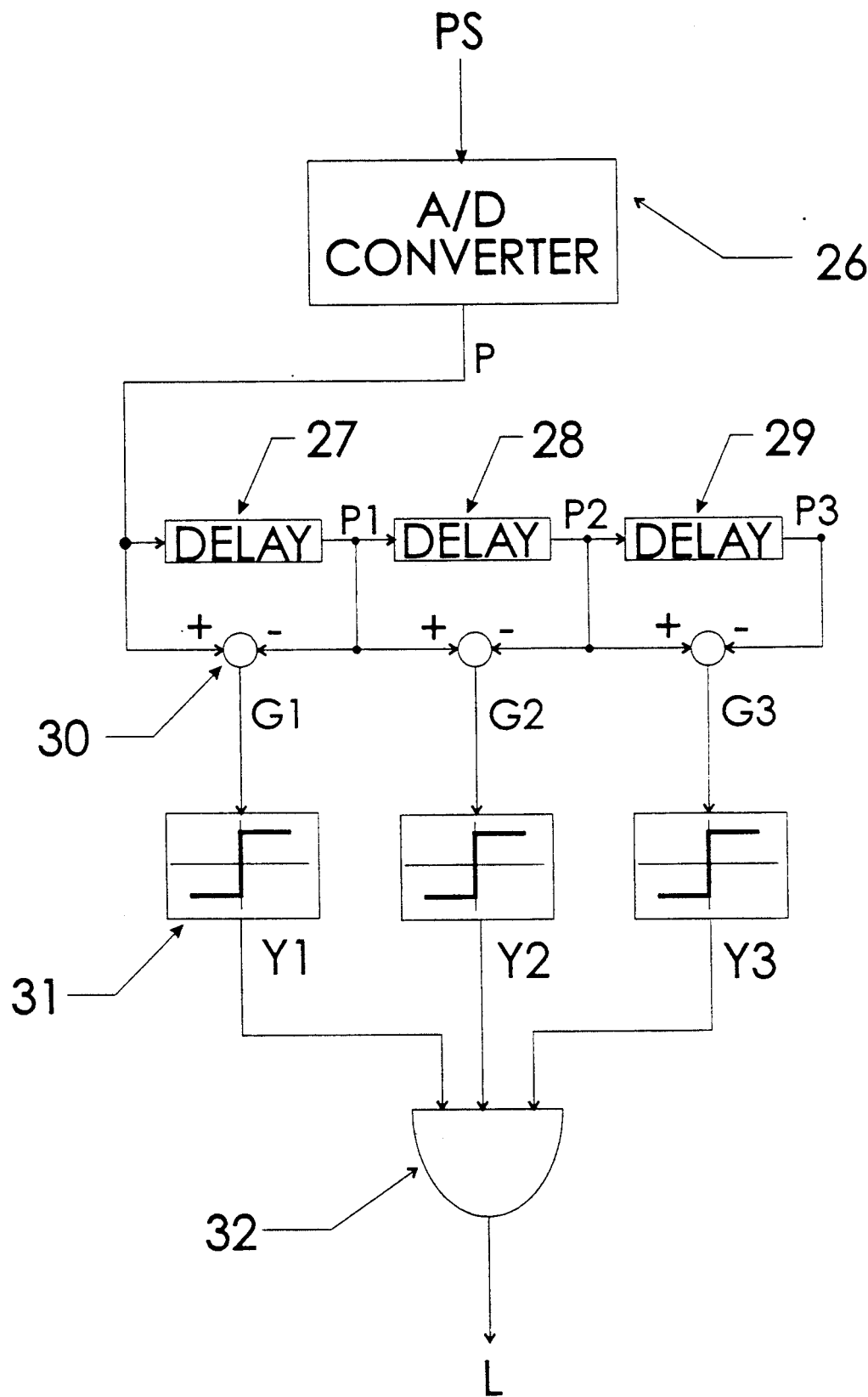
FIG. 3 is a functional block diagram showing the leak detection logic shown in FIG. 2.

Referring now to FIG. 3, the leak detection logic will be described. The signal Ps, previously described as the output from pressure sensor 4 of FIG. 1 is used to detect a leak in the embodiment by digital logic. The signal Ps is applied as input to the analog to digital (A/D) converter 26 and the output is digital signal P. As described in flowchart form, the signal P is delayed by delay block 27 and stored in a buffer register as signal P1. Similarly, the signal P1 is delayed by delay block 28 and the result stored in a buffer register as the twice delayed signal P2, and the signal P2 is delayed by delay block 29 and the result stored in a buffer register as the thrice delayed signal P3. In the preferred embodiment, the signal P and the delayed signal Pi are input to digital subtractor 30 so as to form the differential signal G1 such that the value of G1 is equal to the value of P minus the value of P1, making the value of G1 positive if the pressure signal is decreasing over time in decrements at least as large as the least significant bit (LSB) of the A/D converter 26. Similarly the differential signal G2 is formed by the subtraction of P2 from P1 and the differential signal G3 is formed by the subtraction of P3 from P2. In the preferred embodiment, the differential signals G1, G2, and G3 are each fed to a block 31 to produce signals Y1, Y2, and Y3, respectively, where the functionality of the block is represented by the signum function, i.e., $Y = sgn(G)$. This provides a digital one at the output Y if the input G is positive and a digital zero if the input G is negative. The outputs Y1, Y2, and Y3 are therefore set one or high if the pressure differential signals G1, G2, and G3 are positive which indicates a decreasing pressure, indicative of a leak in the system. In other embodiments of the invention the carry bit from the digital subtractors could be output directly or passed through a buffer or flip-flop, or the delayed pressure signals fed to the inverting and non-inverting inputs of a comparator to produce signals at the comparator outputs correctly responsive to the sign of the differentials. These and other possible variations implementing the functionality described herein are properly considered to be within the scope and spirit of the claims to be presented. The signals Y1, Y2, and Y3 are all input to AND gate 32 to produce the output signal L which will be energized to ON or high when a leak is present. The leak signal L thus requires three successive decreases in pressure to indicate a leak, so as to average out spurious noise effects in the measurement of the pressure signal.

Figure 4:
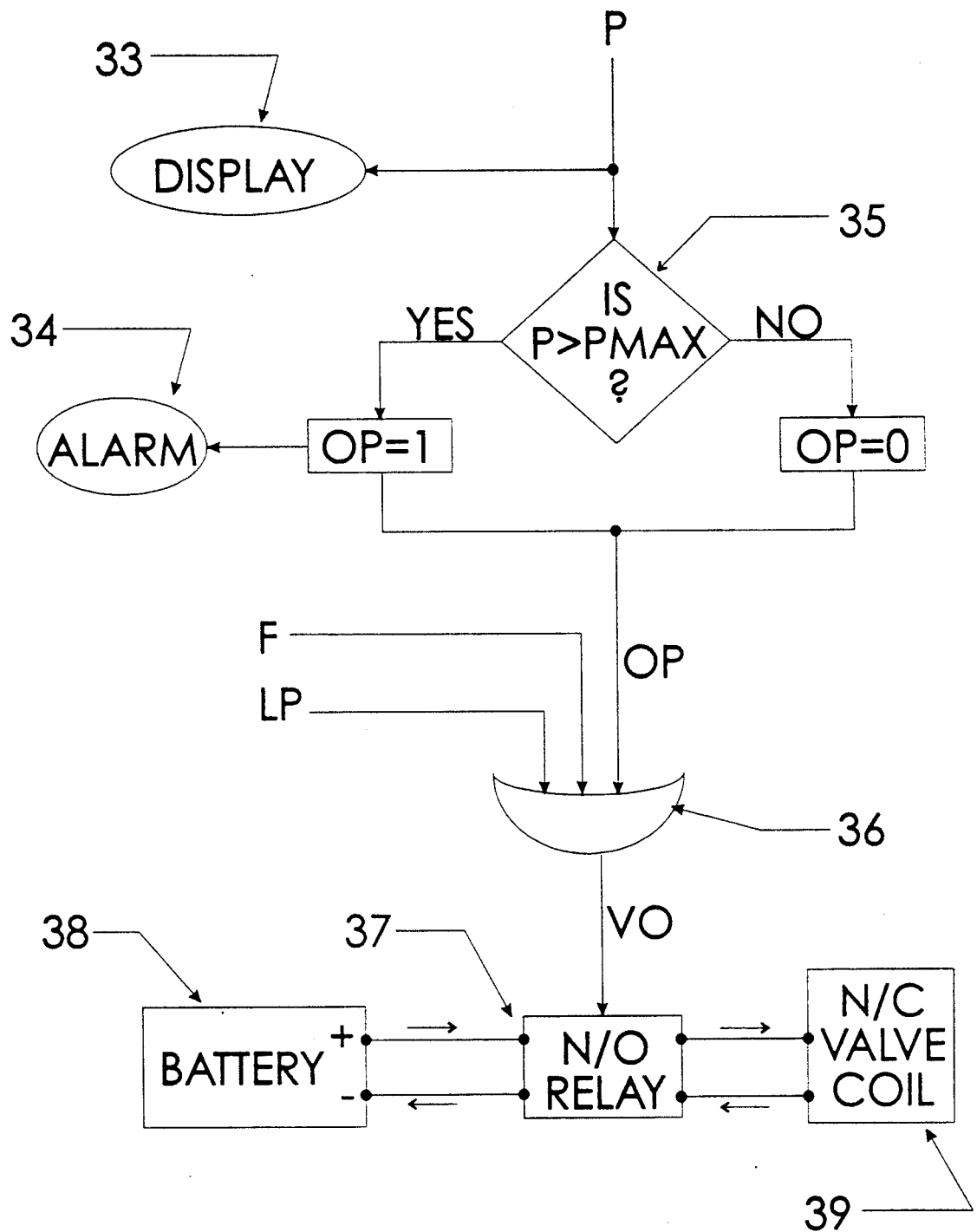
FIG. 4 is a functional block diagram showing the generation of the control signals shown in FIG. 1 in response to the detection of an overpressure condition by the device.

Referring now to FIG. 4, the safety functions performed by the device in response to an overpressure condition are described. If an overpressure condition is detected, a signal is generated which is used to dump water to the vented tank. The same dumping action can be initiated by detection of a leak condition, thus preventing leakage to the interior of the RV from the externally supplied water should the valve 11 of prior FIG. 1 not be installed and thus available to isolate the RV plumbing from said external source. In the preferred embodiment, the digital pressure signal P previously discussed is applied to display block 33. In other embodiments of the invention, the analog pressure sensor signal PS shown in the prior FIG. 1 can directly drive an analog meter to display the pressure. In another preferred embodiment of the invention, the pressure signal PS might be a current, typically 4 to 20 milliamperes, output from a pressure transmitter 4 in prior FIG. 1, in which case a proper shunt resistor may be utilized to provide the appropriate voltage drop to drive the analog meter. These and other possible variations implementing the functionality described herein are properly considered to be within the scope and spirit of the claims to be presented. Returning to FIG. 4, the pressure signal P is applied to comparison block 35, where it is compared to the maximum allowable pressure, denoted by PMAX in the figure. Typically a safe limit is about 60 psi for recreational vehicle plumbing systems. If the pressure signal P is less than PMAX, the overpressure signal OP is set or left zero or OFF. If the pressure signal P is greater than PMAX, indicating an excessive pressure condition, the overpressure signal OP is set high or ON and energizes alarm 34 In another preferred embodiment of the invention, the functionality of the comparison block 35 may be embodied in the use of a comparator with the analog pressure signal PS applied to the non-inverting input of a comparator and the output of a voltage divider applied to the inverting input of the comparator, the voltage being scaled to correspond to the calibrated output signal of the pressure sensor 4 in prior FIG. 1 at the maximum allowable pressure. These and other possible variations implementing the functionality described herein are properly considered to be within the scope and spirit of the claims to be presented.

Still referring to FIG. 4, the safety action performed by the invention is now described. The overpressure signal OP, having been activated ON in response to the detection of an overpressure condition, is also applied to OR gate 36. The output of the OR gate is valve open command VO which is used to close normally open relay 37. This permits current flow from the battery 38 to the coil 39 of the normally closed valve 5, represented in the hydraulic sense in prior FIG. 1. This allows the dumping of water to the water tank 1 of prior FIG. 1, which is vented to atmosphere by vent 7 of prior FIG. 1, thereby providing a relief to the overpressure condition. This dumping action can also be initiated by the activation of fill signal F in FIG. 4 or the leak protection signal LP which are also input to OR gate 36 along with overpressure signal OP. since the property of said OR gate provides that any of the input signals Lp, F, or OP being ON causes output VO to be ON, the same dumping action as described above can be initiated by activating the fill signal F or in response to the previously described generation of leak protection signal LP.

Figure 5:
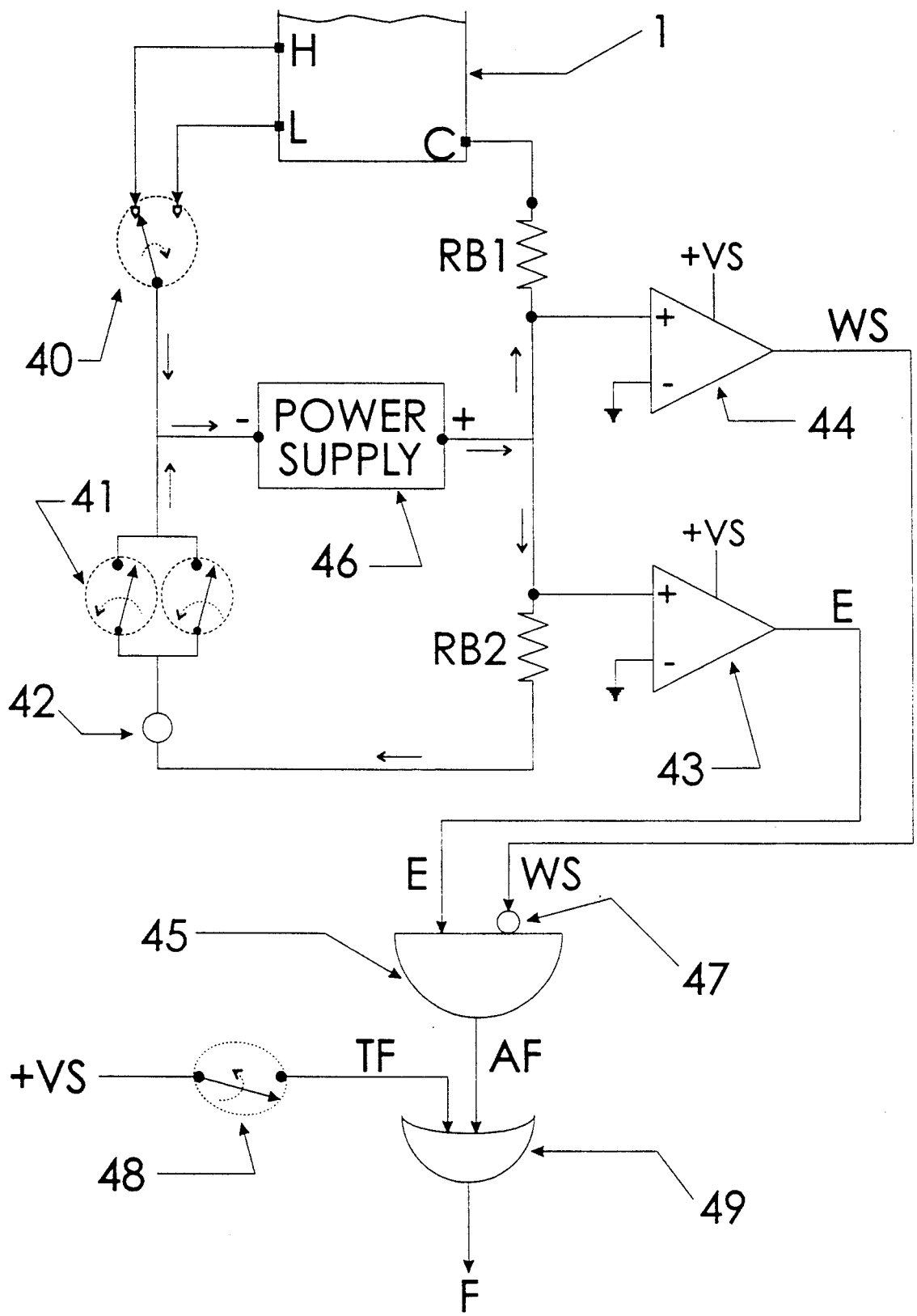
FIG. 5 is a diagram showing the logic circuitry used to generate the control signal F shown in FIG. 4.

Referring now to FIG. 5, the generation of fill signal F will be described. Typically in recreational vehicles and the like water tank 1 of prior FIG. 1 is instrumented with probes which protrude through the tank walls and are electrically connected through wiring to a central panel in the interior of the vehicle which indicates the level of the water in the tank. Typically used in the art are one probe near the bottom of the tank for a common terminal, and four probes at increasing vertical heights so that the panels commercially available can provide indication of the tank water being at the empty, one fourth, one half, three fourths, and full levels. Returning to FIG. 5, the common probe is represented as electrical contact C on the tank 1. Electrical contact L on said tank in the figure represents either the one fourth level or the one half level tank probe, and electrical contact H in the figure represents either the three fourths or full level probe. Thusly contact H represents a relatively high water level whereas contact L represents a low water level. Wires connected to contacts L and H are connected to single pole double throw (SPDT) switch 40, allowing either high or low water level to be selected. In another preferred embodiment of the invention, wires connected to all the aforementioned probes can be connected to a selector switch instead of the SPDT switch 2 which accepts multiple connections to provide more choices in levels beyond high and low. These and other possible variations implementing the functionality described herein are properly considered to be within the scope and spirit of the claims to be presented. The switch 40, with one side connected to selectable probes, is electrically connected on its other side to the negative terminal of the power supply 46 which could be the cabin battery of the recreational vehicle or vessel. The resistor RB1 in the figure is connected between the positive terminal of the power supply and the common probe contact C. The other side of resistor RB1 is electrically connected to both the positive terminal of the power supply and also to the non-inverting input of operational amplifier 44. Current then flows from the positive terminal of the power supply through RB1 to electrical contact C and through the water to the selected probe contact H or L when the water level is at or above said selected probe. If the water level is below the selected probe, there is an open circuit at C and no current flows through RB1. When the water level is at or above the selected probe contact and current flows through resistor RB1, the non-inverting input of operational amplifier 44 goes to a positive voltage relative to the non-inverting input which is tied to ground. This causes the output of said operational amplifier to go positive, or high, saturating to the power supply voltage VS. This output, water sense signal WS, is then fed to the inverter 47 on the input of AND gate 45. Electrical switch arrangement 41 in the preferred embodiment represents two single pole single throw switches (SPST) in parallel. In the preferred embodiment of the invention, one switch is located at the central instrumentation and control panel, while the second is located remotely at the external water connection to the vehicle plumbing system, typically accessible from outside the vehicle through a hatch or compartment door. When either of the parallel switches is closed, current flows from the positive terminal of the power supply 46 through resistor RB2, through an indication light 42, and returns through the closed switch to the negative terminal. In the preferred embodiment of the invention, said indication light is a lamp or light emitting diode (LED) at the central instrumentation and control panel for the purpose of indicating that a switch is closed and the circuit under discussion is enabled. When current flows through resistor RB2, the output of operational amplifier 43 goes high to power supply voltage VS since the current flowing through RB2 causes the voltage drop across RB2 to send the non-inverting input to go high relative to the inverting input, which is electrically grounded. The output of the operational amplifier 44, enable signal E, then goes high or ON. In this manner, the closing of either of switches 41 then causes the enable signal E to be high or ON, which is applied to one input of AND gate 45. The output of said AND gate is auto-fill signal AF, which is activated to ON when enable signal E is ON and water sense signal WS is OFF since the signal WS is logically inverted by inverter 47 before application to said AND gate. Therefore the auto-fill signal AF will be activated ON when the switches 41 are enabled (E=ON) and the water level is below the selected probe (WS=OFF). The auto-fill signal AF is applied to OR gate 49 along with the test flow signal TF. The output of the OR gate, fill signal F, will be ON when either auto-fill signal AF or test fill signal TF is ON. In the preferred embodiment of the invention, the test fill signal TF is generated by a switch 48 connected to the power supply voltage VS. The closure of said switch then generates signal TF logically high to provide testing of the actuation of the valve 5 in prior FIG. 1 an the safety dumping action provided by its opening. Said switch is preferably located at the central instrumentation and control panel.

Having described the invention in detail and by way of reference to preferred embodiments thereof, it will be apparent that other modifications and variations are possible without departing from the scope and spirit of the invention. Accordingly, it is to be understood that the invention is not to be limited by the specific illustrative embodiments, but only by the scope and spirit of the appended claims.

What is claimed is:

1. An instrumentation and control system for the water plumbing system of a recreational vehicle, marine vessel or other mobile self-contained environment, the system comprising, in combination:
- a means for generating an electrical signal responsive to the pressure in said plumbing system;
- a means for displaying said pressure signal;
- a means for detecting a leak in said plumbing system;
- a means for indicating the detection of said leak;
- a means for disabling the on board demand water pump of said recreational vehicle when said leak is detected.

2. A system as in claim 1, further comprising:
- a means for generating a signal responsive to the water pressure in said plumbing system;
- a means for indicating the magnitude of said water pressure;
- a means for generating a signal responsive to the polarity of the differential with respect to time of said pressure magnitude;
- a means for detecting when said signal is of a polarity indicative of decreasing water pressure;
- a means for generating a signal responsive to said detection of decreasing water pressure;
- a means for electrically energizing an alarm providing indication of said detection of a leak condition inferred from said decreasing pressure;
- a means for interrupting the electrical flow path of current to the demand water pump of said plumbing system in response to said detection of leak condition.

3. A system as in claim 1, further comprising;
- a means for providing digital representations of said electrical signal responsive to the water pressure;
- a means for storing said digital pressure signals successively delayed in time;
- a means for generating signals responsive to the differentials between said delayed pressure signals;
- a logic arrangement generating a digital signal responsive to the negative polarity of said differentials;
- a circuit means for amplifying said digital signal to electrically energize the electromagnetic coil of a normally closed relay whose contacts are in electrical communication with a power source and a demand water pump.

4. An instrumentation and control system for the water plumbing system of a recreational vehicle, marine vessel or other mobile self-contained environment, the system comprising, in combination:
- a means for generating an electrical signal responsive to the pressure in said plumbing system;
- a means for displaying said pressure signal;
- a means for detecting a leak in said plumbing system;
- a means for indicating the detection of said leak;
- a means for directing flow of water to a vented water tank in response to said detection of leak condition;
- a means for initiating actuation of said flow of water to said water tank by a user actuated switching action.

5. A system as in claim 4, further comprising;
- a means for isolating said plumbing system from an externally supplied water source when said leak condition is detected.

6. A system as in claim 4, further comprising;
- a means for generating a signal responsive to the water pressure in said plumbing system;
- a means for indicating the magnitude of said water pressure;
- a means for generating a signal responsive to the polarity of the differential with respect to time of said pressure magnitude;
- a means for detecting when said signal is of a polarity indicative of decreasing water pressure;
- a means for generating a signal responsive to said detection of decreasing water pressure;
- a means for electrically energizing an alarm providing indication of detection of a leak condition inferred from said decreasing pressure;
- a means for effecting the opening of a valve to allow said flow of water to said water tank in response to said detection of leak condition.

7. A system as in claim 4, further comprising;
- a means for generating a signal responsive to the water pressure in said plumbing system;
- a means for indicating the magnitude of said water pressure;
- a means for generating a signal responsive to the polarity of the differential with respect to time of said pressure magnitude;
- a means for detecting when said signal is of a polarity indicative of decreasing water pressure;
- a means for generating a signal responsive to said detection of decreasing water pressure;
- a means for electrically energizing an alarm providing indication of detection of a leak condition inferred from said decreasing pressure;
- a means for effecting the opening of a valve to isolate externally supplied water pressure and flow from said plumbing system in response to said detection of leak condition.

8. A system as in claim 4, further comprising;
- a means for providing digital representations of said electrical signal responsive to the water pressure;
- a means for storing said digital pressure signals successively delayed in time;
- a means for generating signals responsive to the differentials between said delayed pressure signals;
- a logic arrangement generating a digital signal responsive to the negative polarity of said differentials;
- a circuit means for amplifying said digital signal to electrically energize the electromagnetic coil of a normally closed valve in hydraulic communication with an externally supplied water pressure.

9. An instrumentation and control system for the water plumbing system of a recreational vehicle, marine vessel or other mobile self-contained environment, the system comprising, in combination;
- a means for sensing pressure in said plumbing system;
- a means for displaying said pressure;
- a means for detecting said pressure exceeding an allowable limit;
- a means for indicating the detection of said excessive pressure condition;
- a means for directing flow of water to a vented water tank;
- a means for effecting the actuation of said flow of water to said water tank by a user actuated switching action.

10. A system as in claim 9, further comprising;
- a means for isolating said plumbing system from an externally supplied water source when said excessive pressure condition is detected.

11. A system as in claim 9, further comprising;
- a means for generating a signal responsive to the water pressure in said plumbing system;

a means for indicating the magnitude of said water pressure;

a comparison means for generating a signal responsive to the excess of said pressure signal over a predetermined maximum limit;

a means for electrically energizing an alarm providing indication of said detection of excessive pressure condition;

a means for effecting the closure of a valve to isolate externally supplied water pressure and flow from said plumbing system in response to said detection of excessive pressure condition.

12. A system as in claim 9, further comprising;

a means for generating a signal responsive to the water pressure in said plumbing system;

a means for indicating the magnitude of said water pressure;

a comparison means for generating a signal responsive to the excess of said pressure signal over a predetermined maximum limit;

a means for electrically energizing an alarm providing indication of said detection of excessive pressure condition;

a means for effecting the opening of a valve to allow said flow of water to said water tank in response to said detection of excessive pressure condition.

13. A system as in claim 9, further comprising;

a means for terminating said user effected flow when the water level in said tank reaches a selected height;

a switching means for selectably switching from a plurality of said heights.

14. A system as in claim 9, further comprising;

a multiple switching means for selectably enabling said actuation from either a remote location exterior to the cabin of said recreational vehicle or from a central panel within;

a means providing an indication of said enabling;

a means for closure of said water flow path and termination of said water flow from the plumbing system to a vented water tank when the water level reaches a selected height;

a switching means for selecting said selected height from a plurality of levels.

15. A system as in claim 14, further comprising, in combination;

an array of electrically conductive probes protruding into the water supply tank of said recreational vehicle at multiple heights and in hydraulic communication with the water inside said tank as said water level reaches said multiple heights, said probes also being in electrical communication with a resistive network;

an operational amplifier whose input is electrically connected to said resistive network and whose output generates a signal responsive to the changes within said resistive network due to hydraulic communication with said water;

a digital gate circuit whose output is a digital logic signal when said water level reaches a selected one of said multiple heights;

an amplifier circuit whose input is a digital logic signal and whose output energizes the electromagnetic coil of a relay, the contacts of said relay providing current flow to the electromagnetic coil of a solenoid valve.

* * * * *